(12) United States Patent
Otsu et al.

(10) Patent No.: US 7,816,623 B2
(45) Date of Patent: Oct. 19, 2010

(54) METHOD AND APPARATUS FOR PROCESSING BRITTLE MATERIAL

(75) Inventors: Yasuhide Otsu, Osaka (JP); Tatsuo Eda, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 271 days.

(21) Appl. No.: 11/976,403

(22) Filed: Oct. 24, 2007

(65) Prior Publication Data

US 2008/0053972 A1  Mar. 6, 2008

Related U.S. Application Data

(62) Division of application No. 10/507,326, filed as application No. PCT/JP03/02941 on Mar. 12, 2003, now Pat. No. 7,304,265.

(30) Foreign Application Priority Data

Mar. 12, 2002  (JP) .............................. 2002-066941

(51) Int. Cl.
   *B23K 26/04* (2006.01)
(52) U.S. Cl. ..................... 219/121.62; 219/121.67; 219/121.72
(58) Field of Classification Search ............ 219/121.67, 219/121.72, 121.83, 121.62, 121.76, 121.68, 219/121.69, 121.73, 121.61
   See application file for complete search history.

(56) References Cited

U.S. PATENT DOCUMENTS 3,790,744 A * 2/1974 Bowen ................. 219/121.69
3,909,582 A * 9/1975 Bowen ................. 219/121.69
4,120,582 A   10/1978 De Vries et al.
4,467,168 A    8/1984 Morgan et al.
4,506,158 A    3/1985 Cadwallader et al.
4,629,859 A * 12/1986 Reddy ................. 219/121.85

(Continued)

FOREIGN PATENT DOCUMENTS

JP          358006785         1/1983

(Continued)

OTHER PUBLICATIONS

International Search Report for PCT/JP03/02941, mailed Jun. 17, 2003.

(Continued)

*Primary Examiner*—M. Alexandra Elve
(74) *Attorney, Agent, or Firm*—Cheng Law Group, PLLC (57) ABSTRACT

In a method for processing brittle material, a laser light from a laser light source irradiates the brittle material and transports an irradiating position of the laser light along a predetermined line, wherein the laser light L from a plurality of laser light sources 11, 12 . . . m1, m2 . . . mn is irradiated simultaneously onto the surface of the brittle material W, and an irradiating range of the laser light, which is set to a predetermined shape, is moved over the surface of the brittle material. Furthermore, a plurality of optical wave guides 10 . . . 10 that guide the laser light from the laser light sources 11, 12 . . . m1, m2 . . . mn to the brittle material are provided, and composite laser light L irradiates the surface of the brittle material, with these optical wave guides 10 . . . 10 bundled together.

4 Claims, 4 Drawing Sheets

U.S. PATENT DOCUMENTS

| | | | |
|---|---|---|---|
| 4,832,023 A | | 5/1989 | Murphy-Chutorian et al. |
| 4,839,493 A | * | 6/1989 | Herziger et al. ......... 219/121.69 |
| 5,026,979 A | * | 6/1991 | Ortiz et al. .................. 250/205 |
| 5,045,669 A | * | 9/1991 | Ortiz et al. ............. 219/121.83 |
| 5,254,833 A | | 10/1993 | Okiyama |
| 5,290,280 A | | 3/1994 | Daikuzono |
| 5,430,816 A | | 7/1995 | Furuya et al. |
| 5,434,699 A | | 7/1995 | Berkovic et al. |
| 5,513,195 A | | 4/1996 | Opower et al. |
| 5,541,057 A | | 7/1996 | Bogart et al. |
| 5,566,196 A | * | 10/1996 | Scifres .......................... 372/6 |
| 5,629,214 A | | 5/1997 | Crosby |
| 5,637,244 A | * | 6/1997 | Erokhin ................. 219/121.69 |
| 5,643,801 A | | 7/1997 | Ishihara et al. |
| 5,665,134 A | | 9/1997 | Kirby et al. |
| 5,681,490 A | * | 10/1997 | Chang ................... 219/121.64 |
| 5,684,642 A | * | 11/1997 | Zumoto et al. ............... 359/740 |
| 5,705,788 A | * | 1/1998 | Beyer et al. ............ 219/121.62 |
| 5,729,568 A | * | 3/1998 | Opower et al. ............... 372/108 |
| 5,763,853 A | | 6/1998 | Shimomura et al. |
| 5,826,772 A | | 10/1998 | Ariglio et al. |
| 5,984,159 A | | 11/1999 | Ostendarp et al. |
| 6,023,039 A | | 2/2000 | Sawada |
| 6,056,188 A | | 5/2000 | Azdasht et al. |
| 6,086,366 A | | 7/2000 | Mueller et al. |
| 6,112,967 A | * | 9/2000 | Ostendarp et al. .......... 225/93.5 |
| 6,130,401 A | | 10/2000 | Yoo et al. |
| 6,156,030 A | | 12/2000 | Neev |
| 6,163,010 A | | 12/2000 | Kobsa |
| 6,211,488 B1 | * | 4/2001 | Hoekstra et al. ....... 219/121.72 |
| 6,285,855 B1 | | 9/2001 | Tsuji |
| 6,297,470 B1 | | 10/2001 | Stelzl |
| 6,407,360 B1 | | 6/2002 | Choo et al. |
| 6,423,933 B2 | | 7/2002 | Nicholas et al. |
| 6,482,199 B1 | | 11/2002 | Neev |
| 6,501,047 B1 | * | 12/2002 | Xuan et al. ............ 219/121.69 |
| 6,537,832 B2 | | 3/2003 | Otsubo et al. |
| 6,590,181 B2 | * | 7/2003 | Choo et al. ............ 219/121.68 |
| 6,713,718 B1 | | 3/2004 | Lu |
| 6,723,952 B2 | | 4/2004 | Choo et al. |
| 6,784,399 B2 | | 8/2004 | Dunsky et al. |
| 6,787,732 B1 | * | 9/2004 | Xuan et al. ............ 219/121.67 |
| 6,811,069 B2 | * | 11/2004 | Hauer et al. ................ 225/93.5 |
| 6,856,634 B2 | | 2/2005 | Mikame |
| 6,888,853 B1 | | 5/2005 | Jurgensen |
| 6,894,249 B1 | | 5/2005 | Hauer et al. |
| 6,947,635 B2 | | 9/2005 | Kohns |
| 7,008,414 B2 | | 3/2006 | Owa et al. |
| 7,058,093 B2 | | 6/2006 | Kennedy et al. |
| 2002/0135745 A1 | | 9/2002 | Fischer et al. |
| 2003/0074096 A1 | | 4/2003 | Das et al. |

FOREIGN PATENT DOCUMENTS

| | | |
|---|---|---|
| JP | 359007491 | 1/1984 |
| JP | 402232618 A | 9/1990 |
| JP | 405139787 | 6/1993 |
| JP | 407328781 | 12/1995 |
| JP | 09012327 | 1/1997 |
| JP | 409019785 | 1/1997 |
| JP | 09-155851 A1 | 6/1997 |
| JP | 10-006051 A1 | 1/1998 |
| JP | 410034364 | 2/1998 |
| JP | 11-160667 A | 6/1999 |
| JP | 11-245059 A1 | 9/1999 |
| JP | 11-254160 | 9/1999 |
| JP | 411347766 | 12/1999 |
| JP | 2000-141071 | 5/2000 |
| JP | 2000-153379 | 6/2000 |
| JP | 2000-281373 | 10/2000 |
| JP | 2001-053368 A1 | 2/2001 |
| JP | 2001-228449 A1 | 8/2001 |
| JP | 2001-255491 A1 | 9/2001 |
| JP | 2001-293586 | 10/2001 |
| JP | 2002-006510 A1 | 1/2002 |
| JP | 2002-035979 A1 | 2/2002 |

OTHER PUBLICATIONS

International Preliminary Examination Report for PCT/JP03/02941, completed Dec. 24, 2003.
JPO Office Action dated May 15, 2007 for corresponding Japanese Patent Application No. 2003-574401.
International Search Report for PCT/JP03/02941 mailed on Jun. 17, 2003.
International Preliminary Examination Report for PCT/JP03/02941 completed on Dec. 24, 2003.
Japanese Office Action; Application No. 2003-574401, Dated May 7, 2007.

* cited by examiner

METHOD AND APPARATUS FOR PROCESSING BRITTLE MATERIAL

CROSS REFERENCE TO RELATED APPLICATIONS

The present application is a Divisional Application of patent application Ser. No. 10/507,326, now U.S. Pat. No. 7,304,265 filed Sep. 10, 2004, which is a 371 application of PCT/JP2003/02941 filed on Mar. 12, 2003, the entire contents of which are incorporated herein by reference.

TECHNICAL FIELD

The present invention relates to a method and an apparatus for processing brittle materials such as glass, ceramics or semiconductor wafers.

BACKGROUND ART

It is known that when laser light from a laser light source irradiates the surface of a brittle material to be processed, heating distortions generated at this time due to the changes in heating and cooling can be used to process the brittle material.

For example, JP H3-13040B discloses a processing method in which the brittle material is cleaved by guiding a crack formed at the start of the processing of the brittle material along a processing line by the heat strain due to the laser light irradiation. Further, Tokuhyo H8-509947 (Japanese Patent No. 3027768) discloses a processing method in which a crack is formed from the surface of the material to a predetermined depth by the heat strain due to laser light irradiation onto the brittle material, and the brittle material is cut using this crack.

Typical laser light sources used in this type of processing include gas lasers such as HF lasers with an emission wavelength of 2.9 μm, CO lasers with an emission wavelength of 5.5 μm, and $CO_2$ lasers with an emission wavelength of about 10 μm and the like. Furthermore, solid-state lasers such as ruby lasers or semiconductor lasers or the like, which emit a variety of wavelengths, are commercially available.

Of the laser light sources available commercially, laser light with wavelengths of about 1 to 3 μm is used for processing semiconductor wafers of silicon and the like, while laser light of wavelengths of about 5 to 10.6 μm is used in the processing of brittle materials such as glass and the like. Furthermore, various ceramic materials are processed using laser light with wavelengths of about 1 to 10.6 μm.

However, with the processing method using laser light, the light absorptance of the processing material will greatly change depending on the wavelength of the irradiated laser light. When that absorptance is large, most of the irradiated laser light is absorbed in the vicinity of the material surface, and direct heating by irradiating laser light that does not depend on thermal conduction will not extend more than a few μm from the material surface.

Figure 6:
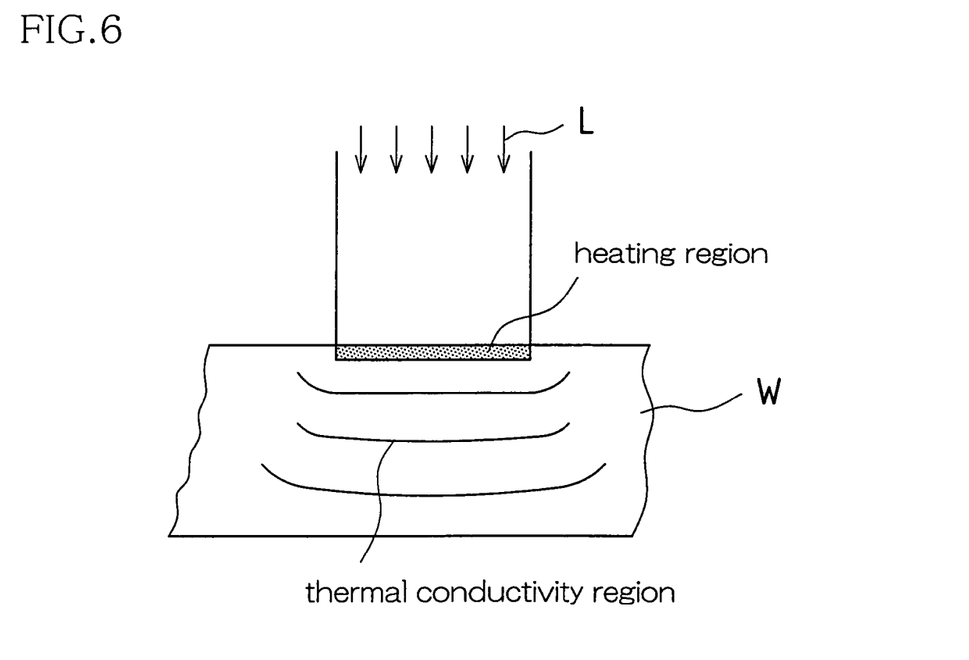
FIG. 6 is a diagram showing schematically the condition when only the surface vicinity of the brittle material is heated by laser light irradiation.

Showing this condition in FIG. 6, the heated region that is heated by irradiation of laser light L is extremely localized in the surface vicinity when compared to the thickness of the brittle material W, and propagation of heat to the material interior occurs by thermal conduction (thermal conduction zone). Due to this, as a large amount of time is needed before the material interior is extensively heated, this has been a large hindrance to speeding up the process time.

According to the processing methods disclosed in JP H3-13040B or Tokuhyo H8-509947 (Japanese Patent No. 3027768), consideration towards the selection of the laser light wavelength is not particularly strict, and often the irradiated laser light is not at the optimum absorption wavelength. Because of this, a long time is required to increase the temperature of the interior of the material, it is necessary to lengthen the laser light irradiating period, and processing speed cannot accelerated.

Further, as a different problem which occurs when the irradiating time is lengthened, before attaining the temperature necessary for processing (crack formation), the inside of the material, the temperature of the surface vicinity of the irradiated portion is heated to near or above the melting temperature of the material, and there is the problem that if the vicinity of the material surface melts, it becomes difficult to obtain an accurate scribe line. It should be noted that in the processing method disclosed in Tokuhyo H8-509947 (Japanese Patent No. 3027768), there is also the problem that because a long time is required to heat the material interior to a sufficient temperature, cracks cannot be formed deep into the material within the heating times for scanning speeds that are used in practice.

In order to obtain a practically effective processing speed, examples have been disclosed which are realized by the addition of contrivances onto optical systems that are combinations of various lenses or optical parts, such as a laser beam emitted from the laser emitting portion arranged so as to widen in the scanning direction in an elliptical-shape or oval-shape, with the intention to have an irradiation area of laser light used in the process that is as wide as possible.

DISCLOSURE OF INVENTION

In view of the facts of the situation, an object of the present invention is to provide a method and an apparatus for processing brittle material at a fast process speed.

According to the present invention, a method for cutting brittle material by irradiating laser light from a laser light source onto a brittle material to generate thermal distortions over a wide range of the brittle material, providing cracks in the interior of the brittle material and moving that irradiating position along a predetermined line of the brittle material to cut the brittle material, comprises providing a plurality of optical fibers which guide laser lights from a plurality of laser light sources to the brittle material; driving the plurality of laser light sources, with the plurality of optical fibers in a bundled condition such that irradiating spots of the lights irradiating the brittle material are arranged in a matrix arrangement, for irradiating a composite laser light which achieves a predetermined shape onto the surface of the brittle material; and adjusting a light intensity distribution of this composite laser light by controlling respectively the light intensity of the plurality of the laser light sources.

In this method, it is preferable to set the shape of the composite laser light by selectively driving the plurality of laser light sources.

Furthermore, it is also possible to set the shape of the composite laser light by selecting a method for bundling the plurality of optical fibers.

Moreover, it is also possible to set the plurality of laser light sources to different output intensities.

Furthermore, it is also possible to set the shape of the composite laser light by controlling an emission start time of the plurality of light sources to a predetermined sequence of time differences.

The operation of the processing method of the present invention is explained below.

If a brittle material is simultaneously irradiated with laser light from a plurality of laser light sources, the irradiating area that the laser light irradiates increases, the irradiating area of laser light on the surface of the brittle material to be processed greatly widens and the heated volume of the inside of the material that is heated per irradiated time increases. This generates thermal distortions across a wide range, and as a result of propagating at high speed cracks extending to deep regions, at the same time as moving the laser light in a predetermined direction relative to the surface of the brittle material, processing speed can be increased while scanning.

Moreover, by irradiating simultaneously low laser light from multiple laser light sources onto the brittle material, it is possible to use low output semiconductor lasers as the laser light source.

That is to say, the output strength of ordinary semiconductor lasers is low compared to gas lasers, and the output strength per single laser is insufficient, however by using a multitude of semiconductor lasers, and by simultaneously irradiating laser light onto the surface of the brittle material to be processed, it is possible to generate thermal distortions over a wide area by applying the necessary thermal effect simultaneously on a wide surface region of the brittle material.

The effect of the processing method of the present invention is explained in further detail.

First, the output of the laser light source can be approximated by a Gaussian function.

Figure 2:
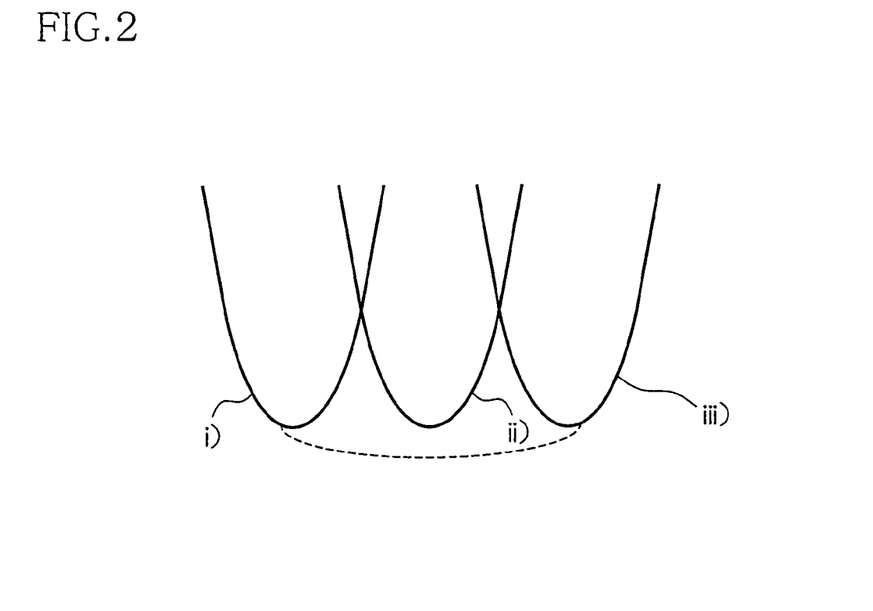
FIG. 2 is a diagram showing schematically a 2-D optical intensity distribution when laser light from a plurality of laser light sources irradiates a brittle material.
Figure 3A:
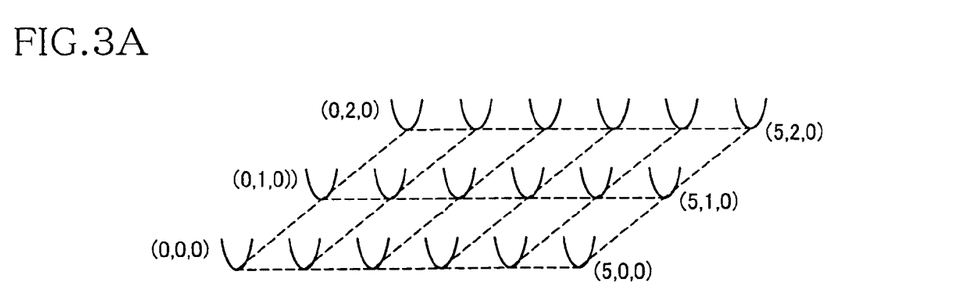
Figure 3B:
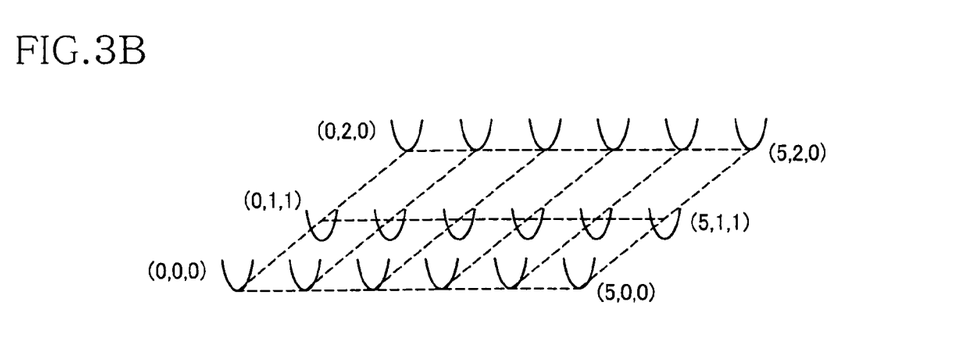

Now, the distribution shape in two dimensions of the light output intensity of a single laser light source is approximated as a quadratic function in order to facilitate understanding. As shown in FIG. 2, it is assumed that laser light from three laser light sources simultaneously irradiates three slightly offset locations. Using appropriate constants a, b, c and d with the output intensity distribution graph shapes shown by i), ii) and iii), if the functions are expressed respectively as $y1 = a(x+b)^2 + c$ $y2 = ax^2 + c$ $y3 = a(x-d)^2 + c$ then the light intensity distribution can be expressed similarly as a quadratic function which is a synthesis of the three light output strengths $Y = A(x-B)^2 + C.$ Here, A, B, and C are appropriate constants. Consequently, the result is that laser light irradiates over a wide area as if from a single laser light source. It should be noted that in practice, because the arrangement of the laser light sources (the irradiating spot of the laser light) is arrayed in three dimensions, the two-dimensional transformation described above becomes a three-dimensional distribution transformation. FIG. 3A and FIG. 3B show schematically an example of this kind. FIG. 3A shows schematically a condition in which the positions of the beam peaks are positioned at equidistant lattice points in a two-dimensional plane-shape. The position of each peak is expressed using three-dimensional coordinates. FIG. 3B on the other hand, shows schematically a condition in which the peak position of the central beam is shifted one step below the position of the lattice point peak position of other rows which are arranged in a uniform two dimensional plane. When the output of each beam is roughly the same, this condition corresponds to the case that when an attachment position of the output portion of the laser corresponding to the central row beam is shifted down. Furthermore, when the attachment position of the output portion of each beam is a lattice point arranged equidistantly in a two-dimensional planar shape, this also corresponds to the case that the output of the laser which corresponds to the central row beam is large.

Because of the above, by simultaneously irradiating the brittle material with laser light from more laser light sources it becomes possible to simultaneously irradiate the surface region over a wide area. The result of this is that a large volume of the internal portion of the brittle material can be simultaneously heated, and it is possible to increase the process speed.

According to the present invention, an apparatus suitable for carrying out the brittle material process method having the characteristics described above, in which laser light from a laser light source is irradiated onto the brittle material and that irradiating position is moved along a predetermined line, comprises a plurality of laser light sources; a plurality of optical fibers, bundled so as to guide the laser light from each laser light source to a surface of the brittle material, and arranged such that irradiating spots of the laser lights irradiating the brittle material are arranged in a matrix arrangement; and a scanning means for moving a position at which the laser light is irradiated onto the brittle material; wherein the composite laser light which has a predetermined shape is irradiated onto the surface of the brittle material with the plurality of bundled optical fibers, and the light intensity distribution of this composite laser light is adjusted by controlling respectively the light intensity of the plurality of laser light sources.

In this configuration, it is preferable to provide a light intensity measuring means for measuring a light intensity distribution of the composite laser light on the irradiated surface of the brittle material. Moreover, it is preferable to provide a transportation means for transporting the light intensity measuring means along the laser light irradiated surface of the brittle material."

According to the processing apparatus of the present invention, it can be confirmed whether the composite intensity distribution of the laser light which is irradiated onto the brittle material is attaining the desired intensity distribution, based on the output of the light intensity measuring means. Furthermore, when a plurality of laser light sources having different output intensities is used, the kind of intensity distribution that the composite intensity distribution obtains can be confirmed.

It should be noted that, by the irradiation of laser light from the laser light sources, the present invention is suitable for both a cutting process in which cracks are cut deep into the brittle material, and a cleaving process in which the brittle material is completely separated along a process line (scribe line) using only irradiation with laser light.

BRIEF DESCRIPTION OF DRAWINGS

FIG. 3, consisting of FIGS. 3A and 3B, is a diagram showing schematically a 3-D optical intensity distribution when laser light from a plurality of laser light sources irradiates a brittle material.

FIG. 4, consisting of FIGS. 4(A) to 4(G), is a diagram showing an example of a beam shape (viewed from above) which can be set when a plurality of laser light sources is used.

FIG. 5, consisting of FIGS. 5(A) to 5(D), is a diagram showing another example of a beam shape (viewed from above) which can be set when a plurality of laser light sources is used.

BEST MODE FOR CARRYING OUT THE INVENTION

An embodiment of the present invention is explained below based on the drawings.

Figure 1:
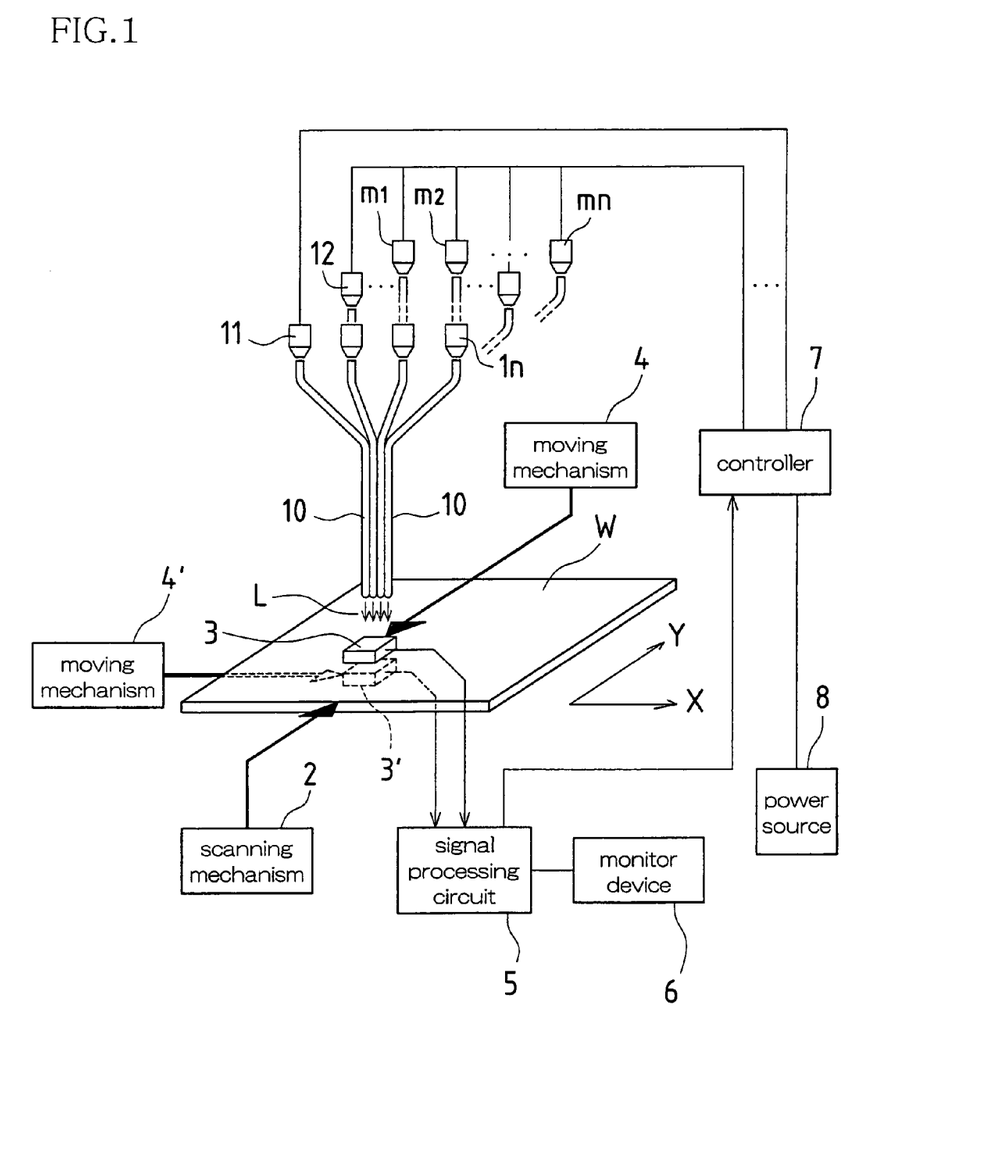
FIG. 1 is a diagram showing schematically a configuration of an embodiment of the present invention.

FIG. 1 is a diagram showing schematically the configuration of an embodiment of the present invention.

The processing apparatus in FIG. 1 is provided with a plurality of laser light sources 11, 12 . . . m1, m2 . . . mn. Semiconductor lasers are used as these laser light sources 11, 12 . . . m1, m2 . . . mn.

The plurality of light sources 11, 12 . . . m1, m2 . . . mn are arranged in a matrix pattern at position above a brittle material W to be processed. The laser light from the laser light sources 11, 12 . . . m1, m2 . . . mn is guided respectively to the surface of the brittle material W via hollow optical fibers 10 . . . 10 and is simultaneously irradiated onto the surface of the brittle material W.

The front ends of the plurality of hollow optical fibers 10 . . . 10 are bundled together, and a laser light L from the laser light sources 11, 12 . . . m1, m2 . . . mn is irradiated in this bundled condition onto the brittle material W. The irradiating spots of the laser light L are arranged in a matrix pattern in an X-Y direction and form a three dimensional light intensity distribution as shown schematically in FIGS. 3A and 3B by laser light irradiation onto the brittle material W.

The brittle material W to be processed is transported in the X-Y direction by a scanning mechanism 2 such as an X-Y table or the like. A light intensity measuring device 3 is arranged below the plurality of laser light sources 11, 12 . . . m1, m2 . . . mn.

The light intensity measuring device 3 is arranged selectively in the surface vicinity of the brittle material W to be processed. The light intensity measuring device 3 is transported in a direction parallel to (horizontal direction) the surface of the brittle material W by a transport mechanism 4, and by this movement it can measure the composite light intensity distribution of the laser light L that is irradiated onto the surface of the brittle material W.

After predetermined signal processing by a signal processing circuit 5, the output of the light intensity measuring device 3 is entered into a monitor device 6, and an image of the light intensity distribution is displayed on that monitor screen. It should be noted that the light intensity measuring device 3 is moved to a position that will not hinder processing during processing of the brittle material W. The laser light sources 11 . . . mn are electrically connected so as to receive the electrical power necessary for operation from a power source 8 via a controller 7. Furthermore, the intensity distribution data obtained at the surface of the light intensity measuring device 3 is processed electrically by the signal processing circuit 5. That is to say, the multitude of irradiated positions at the surface of the light intensity measuring device 3, and the irradiated intensities at those irradiated positions are processed in a corresponding manner and the corresponding data sent to the controller 7. In order to change the intensity distribution where necessary while confirming the light intensity distribution on the monitor, by inputting to the controller the data of the positions and the intensities that need to be changed, the beam strength outputted from the laser light source can be controlled such that it varies, by adjusting the power supply to any of the laser light sources 11 . . . mn.

Furthermore, if a detecting device 3' equivalent to the light intensity measuring device 3 is provided on the rear side of the brittle material W and a transport mechanism 4' is provided so as to move it in a horizontal direction parallel to the material reverse side, then it is possible to confirm the light intensity transmitted through the rear face side together with the top face side of the brittle material W.

For example, when the brittle material W is thin, the light intensity on the rear face side is greater than necessary, and leaking light energy is equivalent to wasted energy that does not contribute to crack formation. To reduce this type of waste, the transmitted light intensity at the rear face side is measured before starting the cutting work, and if that value is locally, or generally large, then a similar process performance can be obtained even by reducing the light output from the laser light sources 11, 12 . . . m1, m2 . . . mn before carrying out the cutting work.

According to the above embodiment, a plurality of laser light sources (semiconductor lasers) 11, 12 . . . m1, m2 . . . mn are used to irradiate simultaneously the plurality of laser lights L onto the surface of the brittle material W to be processed, so that it is possible to generate thermal distortion over a large range and cause the necessary heat effect simultaneously over a wide region of the surface of the brittle material. As a result, when scanning while moving the laser light L in a predetermined direction relative to the surface of the brittle material W the high speed development of cracks extending to a deep range is possible.

It should be noted that in this embodiment, the irradiation of laser light L from the laser light sources 11, 12 . . . m1, m2 . . . mn allows both a cutting process in which cracks are set deep within the interior of the brittle material, and a cleaving process in which the brittle material W is completely separated by letting a crack formed at the starting point of the processing of the brittle material W advance through laser irradiation.

According to this present embodiment, as the output signal from the light intensity measuring device 3 is processed so as to display the composite intensity distribution on the monitor screen when moving the light intensity measuring device 3 horizontally close to the surface of the brittle material W, it is displayed on the monitor screen whether the intensity distribution necessary for composite intensity distribution of the plurality of laser lights is being obtained or not (for example, whether a predetermined intensity value is obtained at a predetermined position), so it is possible for example to confirm irradiation positions and intensity data values, for example.

Furthermore, it is possible to confirm by analysis of the output signal from the light intensity measuring device 3 what form the composite light intensity distribution has taken using laser light sources 11, 12 . . . m1, m2 . . . mn having different output intensities, for example as shown in FIG. 3B with the matrix arrangement of the laser light sources 11, 12 . . . m1, m2 . . . mn in FIG. 1, in which the light intensity of the centrally positioned laser light sources is stronger than the intensity of the laser light sources in the rows on either side. In such a case, if the composite light intensity distribution has not achieved its predetermined form, the desired composite light intensity distribution can be obtained through a control by inputting to the controller 7 the data for the necessary current values of the laser light sources 11, 12 . . . m1, m2 . . . mn.

In this embodiment of the present invention, by choosing from the plurality of laser light sources 11, 12 . . . m1, m2 . .

. mn those laser light sources that are driven, or by suitably arranging the front ends of the hollow optical fibers 10 ... 10, (the bundling method) it is possible to set the laser light beam shape which irradiates the brittle material W to the desired shape.

Figure 4:
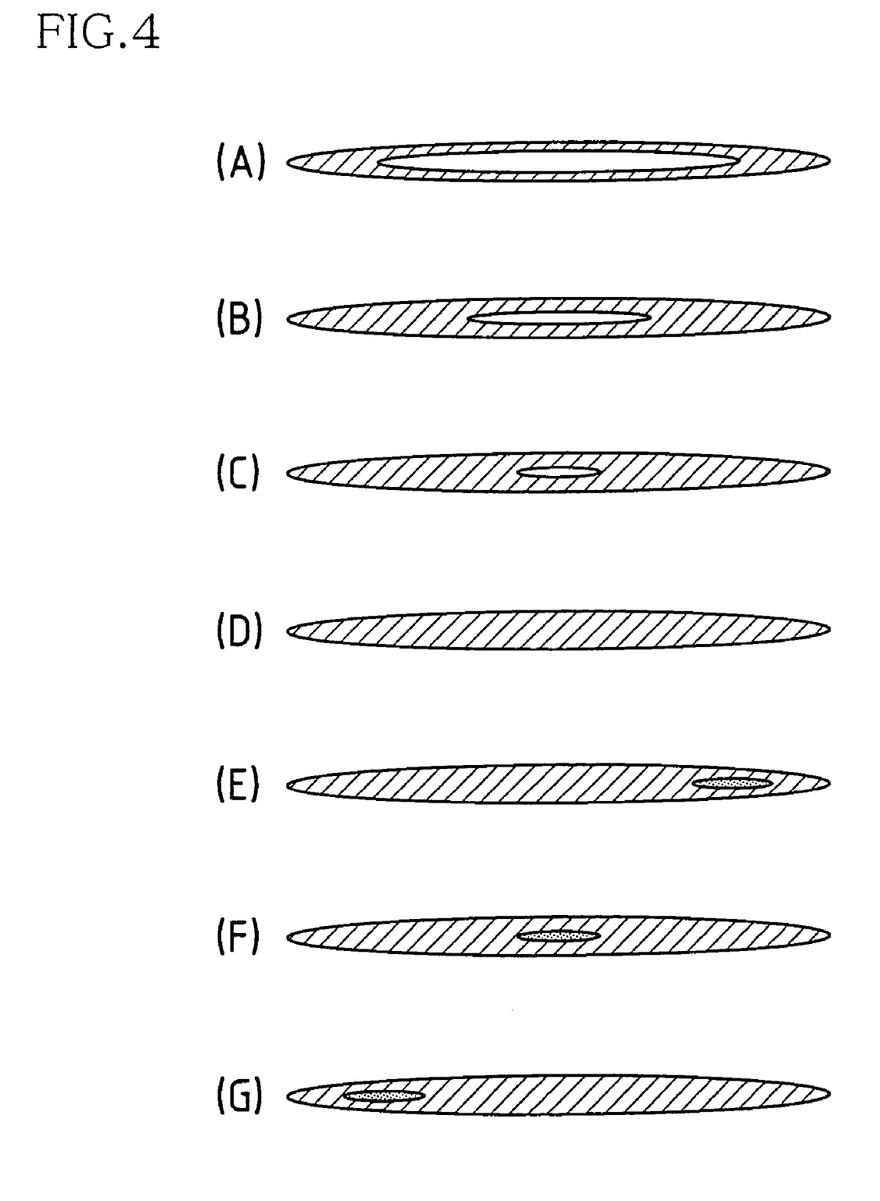
Figure 5:
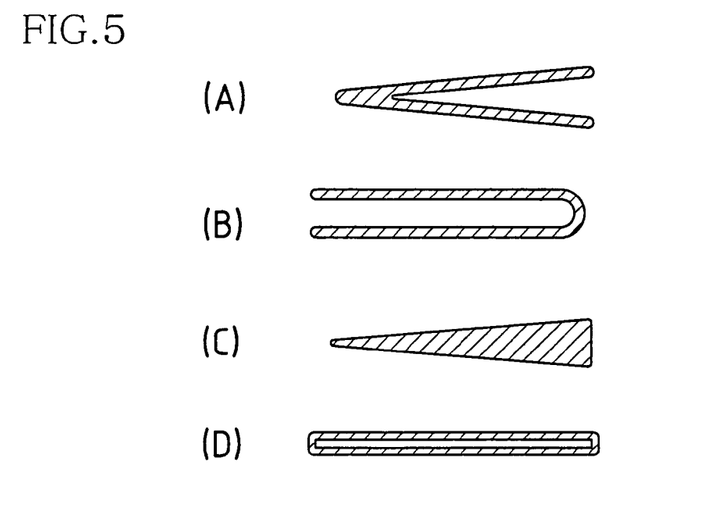

For example, it is possible to configure an elliptical ring mode beam as schematically shown in FIGS. 4(A) to (D), or, in a light intensity distribution having an externally elliptical ring shape as shown in FIGS. 4(E), (F) and (G), to configure the right edge vicinity, the central vicinity and the left edge vicinity within the light intensity distribution region of the respective ring shapes to have a greater light intensity than the regions surrounding them. To show schematically this kind of situation, the regions where light intensity is particularly strong are indicated by cross hatching. It is possible to form a variety of beam shapes like a V-shaped beam shown in FIG. 5(A), a U-shaped beam shown in FIG. 5(B), a triangular beam shown in FIG. 5(C), or a slit-shaped beam shown in FIG. 5(D) or the like without addition of contrivances such as optical systems using optical elements like special lenses or diffraction gratings. In this case, it is effective for speed and accuracy that the vertical width of the beam is narrow. Further, it is effective for speed and accuracy that the horizontal width of the beam is long.

Consequently, it is possible to irradiate, onto the brittle material W laser light with a beam shape in which the number, intensity and arrangement necessary for the combination are appropriately set in accordance with the optimum light intensity distribution shape which is anticipated to correspond to the conditions of the object to be processed (glass quality, thickness and the like), from an applied analysis using a computer in advance and a temperature distribution analysis of thermal conduction.

Moreover, by using a plurality of laser light sources having different output intensities, it is possible to set the composite light intensity distribution of laser light irradiating the surface of the brittle material as desired, so that by performing dynamic calculations and the like which take into account the intensity distribution, it is possible to irradiate the brittle material W with laser light of an optimum beam shape and an optimum light intensity distribution, and increase the process speed even more. Further, consideration must be given to the economics of the case in which the unit price and number of the laser light sources to be used are considered, however the brittle material to be processed is arranged such that composite laser light is irradiated over the full length of the surface region, and by controlling the timing of the generation of the beam output of the laser light sources such that laser light from the laser light sources is irradiated sequentially, it is possible to induce crack formation in the material from one edge to the other without transport of the laser light source which would be carried out with a normal single laser light source or mechanical transport of the table. It is also possible to apply this method of irradiating to cases in which the material is cut by irradiating with the laser along a curved surface or in which the material is cut in a circular shape.

In the above embodiment, an example is shown using a semiconductor laser, however the present invention is not limited to this and it is also possible to apply other types of laser apparatuses such as $CO_2$ lasers or YAG lasers or the like. It should be noted that when using high output laser apparatuses such as $CO_2$ lasers or the like, as the optical wave guide that guides the laser light to the surface of the brittle material, it is possible to use low transmission loss hollow optical fibers and hollow wave guides and the like (Matsuura Y. and Miyagi M: Applied Physics, vol. 68, pp. 41-43, 1993, and Applied Physics, vol. 62, pp. 44-46, 1993).

INDUSTRIAL APPLICABILITY

According to the present invention as described above, it is possible to improve the processing speed as a result of the increase in irradiation area that is irradiated simultaneously by laser light, a considerable widening of the irradiation area of laser light on the surface of the brittle material to be processed and an increase in the heating volume of the internal portion heated per irradiating time. Further, there are also the advantages that it is possible to use low output semiconductor lasers in the processing of the brittle material and the like, and that it is possible to perform the process under the optimum conditions for the brittle material to be processed.

The invention claimed is:

1. A method for cutting brittle material by irradiating laser light from a laser light source onto a brittle material to generate thermal distortions over a wide range of the brittle material, providing a crack in the interior of the brittle material and moving that irradiating position along a predetermined line of the brittle material to cut the brittle material, the brittle material having a front face surface and an opposite rear face surface, the method comprising:

provinding a plurality of optical fibers which guide laser lights from a plurality of laser light sources to the brittle material;

sequentially irradiating the plurality of laser light sources, with the plurality of optical fibers in a bundled condition such that optical fibers for irradiating spots of the lights irradiating the brittle material are arranged in a matrix arrangement aligning in a straight row over the brittle material and that irradiating spots are sequentially irradiated from one end of the front face surface to the other end thereof resulting in crack formation from the one end to the other end of the brittle material, measuring a light intensity distribution of the composite laser light on the irradiated front face surface of the brittle material;

measuring a light intensity of the composite laser light transmitted through the brittle material to the rear face surface of the brittle material; and in response to measuring the light intensity distribution, adjusting the light intensity distribution of the composite laser light by controlling respectively the light intensity of the plurality of the laser light sources and, if the light intensity on the rear face surface of the brittle material is not appropriate, controlling the selected composite laser light intensity, wherein individual ones of the irradiated spots of light arranged in the matrix arrangement occupy separate individual locations on the front face surface of the brittle material and individual ones of the guided laser lights are emitted directly from respective ones of the plurality of optical fibers onto the front face surface of the brittle material.

2. A method for cutting brittle material by irradiating laser light from a laser light source onto a brittle material to generate thermal distortions over a wide range of the brittle material, providing a crack in the interior of the brittle material and moving the irradiating position along a predetermined line of the brittle material to cut the brittle material, the brittle material having a front face surface and an opposite rear face surface, the method comprising:

providing a plurality of optical fibers which guide laser lights from a plurality of laser light sources to the brittle material;

sequentially irradiating the plurality of laser light sources, with the plurality of optical fibers in a bundled condition such that optical fibers for irradiating spots of the lights irradiating the brittle material are arranged in a matrix arrangement aligning in a curvilinear line over the brittle material and those positions of irradiating spots are sequentially irradiated from one end of the curvilinear line to the other end thereof resulting in crack formation along another curvilinear line on the brittle material, measuring a light intensity distribution of the composite laser light on the irradiated front face surface of the brittle material;

measuring a light intensity of the composite laser light transmitted through the brittle material to the rear face surface of the brittle material; and in response to measuring the light intensity distribution, adjusting the light intensity distribution of the composite laser light by controlling respectively the light intensity of the plurality of the laser light sources and, if the light intensity on the rear face surface of the brittle material is not appropriate, controlling the selected composite laser light intensity, wherein individual ones of the irradiated spots of light arranged in the matrix arrangement occupy separate individual locations on the front face surface of the brittle material and individual ones of the guided laser lights are emitted directly from respective ones of the plurality of optical fibers onto the front face surface of the brittle material.

3. An apparatus for cutting brittle material by irradiating laser light from a laser light source onto a brittle material to generate thermal distortions over a wide range of the brittle material, providing a crack in the interior of the brittle material and moving that irradiating position along a predetermined line of the brittle material to cut the brittle material, the brittle material having a front face surface and an opposite rear face surface, the apparatus comprising:

a plurality of optical fibers which guide laser lights from a plurality of laser light sources to the brittle material;

driving means for sequentially irradiating the plurality of laser light sources, with the plurality of optical fibers in a bundled condition such that optical fibers for irradiating spots of the lights irradiating the brittle material are arranged in a matrix arrangement aligning in a straight row over the brittle material and that irradiating spots are sequentially irradiated from one end of the front face surface to the other end thereof resulting in crack formation from the one end to the other end of the brittle material, measuring means for measuring a light intensity distribution of the composite laser light on the irradiated front face surface of the brittle material and for measuring a light intensity of the composite laser light transmitted through the brittle material to the rear face surface of the brittle material; and in response to measuring the light intensity distribution, a controller for adjusting the light intensity distribution of the composite laser light by controlling respectively the light intensity of the plurality of the laser light sources and, if the light intensity on the rear face surface of the brittle material is not appropriate, controlling the selected composite laser light intensity, wherein individual ones of the irradiated spots of light arranged in the matrix arrangement occupy separate individual locations on the front face surface of the brittle material and individual ones of the guided laser lights are emitted directly from respective ones of the plurality of optical fibers onto the front face surface of the brittle material.

4. An apparatus for cutting brittle material by irradiating laser light from a laser light source onto a brittle material to generate thermal distortions over a wide range of the brittle material, providing a crack in the interior of the brittle material and moving the irradiating position along a predetermined line of the brittle material to cut the brittle material, the brittle material having a front face surface and an opposite rear face surface, the apparatus comprising:

a plurality of optical fibers which guide laser lights from a plurality of laser light sources to the brittle material;

driving means for sequentially irradiating the plurality of laser light sources, with the plurality of optical fibers in a bundled condition such that optical fibers for irradiating spots of the lights irradiating the brittle material are arranged in a matrix arrangement aligning in a curvilinear line over the brittle material and those positions of irradiating spots are sequentially irradiated from one end of the curvilinear line to the other end thereof resulting in crack formation along another curvilinear line on the brittle material, measuring means for measuring a light intensity distribution of the composite laser light on the irradiated front face surface of the brittle material and for measuring a light intensity of the composite laser light transmitted through the brittle material to the rear face surface of the brittle material; and in response to measuring the light intensity distribution, a controller for adjusting the light intensity distribution of the composite laser light by controlling respectively the light intensity of the plurality of the laser light sources and, if the light intensity on the rear face surface of the brittle material is not appropriate, controlling the selected composite laser light intensity, wherein individual ones of the irradiated spots of light arranged in the matrix arrangement occupy separate individual locations on the front face surface of the brittle material and individual ones of the guided laser lights are emitted directly from respective ones of the plurality of optical fibers onto the front face surface of the brittle material.

* * * * *